United States Patent [19]

Kato et al.

[11] Patent Number: 5,408,678
[45] Date of Patent: Apr. 18, 1995

[54] INTERFACE CIRCUIT FOR HIGH SPEED DATA TRANSFER BETWEEN A PERIPHERAL DEVICE AND A COMPUTER

[75] Inventors: Yoshiyuki Kato; Daisuke Nagai, both of Kanagawa, Japan

[73] Assignee: Mitsumi Electric Co., Ltd., Tokyo, Japan

[21] Appl. No.: 168,864

[22] Filed: Dec. 16, 1993

[30] Foreign Application Priority Data

Dec. 18, 1992 [JP] Japan .............................. 4-087094 U

[51] Int. Cl.⁶ .............................................. G06F 3/00
[52] U.S. Cl. .............................. 395/800; 364/DIG. 1; 364/238; 364/238.6; 364/239; 395/250
[58] Field of Search .............. 364/200, 238, 239, 240, 364/900, 238.6; 358/343, 342; 369/47; 371/40; 395/800, 250

[56] References Cited

U.S. PATENT DOCUMENTS

4,210,959 7/1980 Wozniak .............................. 364/200
4,802,152 1/1989 Marvoort et al. ..................... 369/32

Primary Examiner—Alyssa H. Bowler
Assistant Examiner—Valerie Darbe
Attorney, Agent, or Firm—Whitham, Curtis, Whitham & McGinn

[57] ABSTRACT

An interface circuit which is connected between a peripheral device and a computer and which can conduct a data transfer at a higher speed. When a first digital data $D_1$ is output from a peripheral device, the transfer of a memory bus enable request signal DRQ to a computer is halted by transfer control means, and the first digital data is output from the peripheral device in accordance with a false read control signal FIOR from an interface circuit, and held in hold means. When a second digital data is output from the peripheral device, DRQ is transferred to the computer, and 2N-bit data, i.e., N-bit second digital data $D_2$ output from the peripheral device, and the N-bit first digital data $D_1$ which is held are simultaneously transferred to the computer in accordance with a read control signal IOR from the computer.

20 Claims, 4 Drawing Sheets

FIG. 3(B) DRQ

FIG. 3(C) DRQ

FIG. 3(D) DAC

FIG. 3(E) FDAC

FIG. 3(F) IOR

FIG. 3(G) FIOR

FIG. 3(J) DAC+FDAC

FIG. 3(K) IOR+FIOR $t_1$ $t_2$ $t_3$ $t_4$ $t_5$ $t_6$

FIG. 4

FIG. 5(A) DRQ

FIG. 5(B) DAC

FIG. 5(C) IOR

FIG. 5(D) D1,D2

INTERFACE CIRCUIT FOR HIGH SPEED DATA TRANSFER BETWEEN A PERIPHERAL DEVICE AND A COMPUTER

BACKGROUND OF THE INVENTION

1. Field of the Invention

The invention relates to an interface circuit, and particularly to an interface circuit between a CD-ROM (Compact Disc-Read Only Memory) drive device and a computer.

2. Related Art

As a system for conducting data input/output operations between a computer and a peripheral device, known is the DMA (Direct Memory Access) method in which a microprocessor controls only the start and end of the input/output operations, and a DMA controller (hereinafter, referred to as merely "controller") controls the data transfer between a memory and the peripheral device, thereby performing a high speed data transfer.

Figure 4:
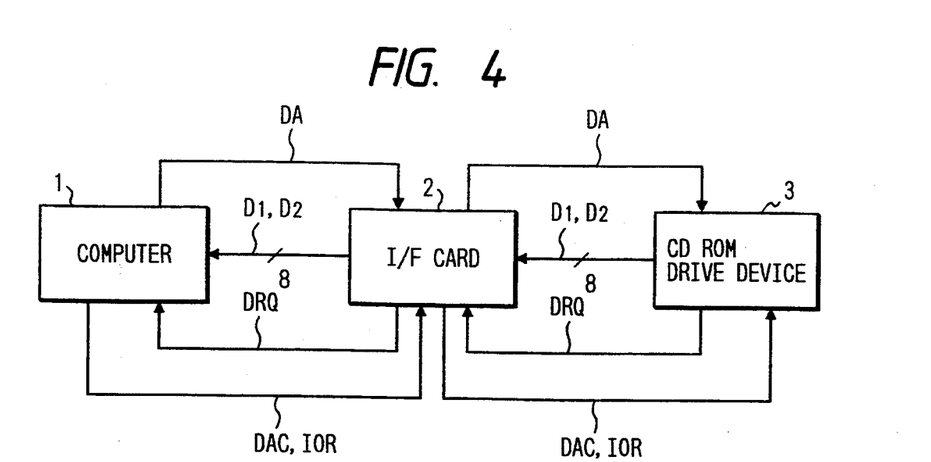
FIG. 4 is a diagram showing an example of a data transfer which is conducted through a conventional art interface circuit.

FIG. 4 is a diagram showing an example of a data transfer in the conventional art which is conducted by the DMA method through an interface circuit (hereinafter, referred to as "I/F card"). In the figure, 1 designates an 8-bit computer, 2 designates an I/F card which is detachably mounted in the computer 1, and 3 designates a CD-ROM drive device (hereinafter, referred to as merely "drive device") which is a peripheral device.

The drive device 3 has a well known configuration in which a digital signal processing circuit for improving the error correction facility is added to a conventional CD (Compact Disc) player for reproducing music, and reproduces 16-bit digital data recorded on a CD-ROM disc and having the same frame structure as that of a compact disc.

Each 16-bit digital data is recorded on a CD-ROM disc after it is converted into two 8-bit symbols and each of the symbols undergoes the EFM modulation to be converted into two 14-bit symbols having a predetermined frame structure to which error correction codes, etc. are added. The drive device 3 reads data from the CD-ROM disc and conducts a predetermined signal process on the readout data, and the data are transferred in 8-bit units to the computer 1 as shown in FIG. 5.

Figure 5A:
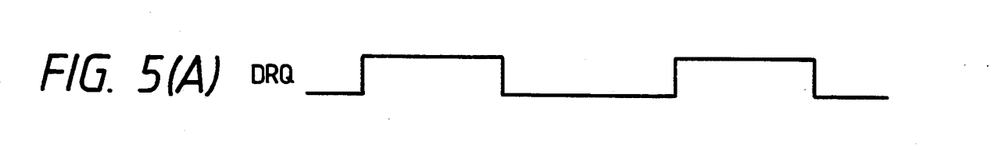

Specifically, when the I/F card 2 receives a DRQ (DMA Request) signal (FIG. 5(A)) from the drive device 3, the I/F card outputs the signal to the computer 1. In response to this, a controller in the computer 1 sends a memory bus (hereinafter, referred to as merely "bus") enable request to a microprocessor. As soon as the memory access process of the microprocessor is completed, the microprocessor gives a bus enable to the controller.

Figure 5B:
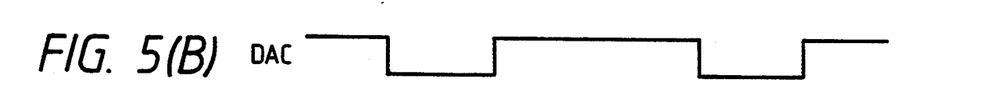
Figure 5C:
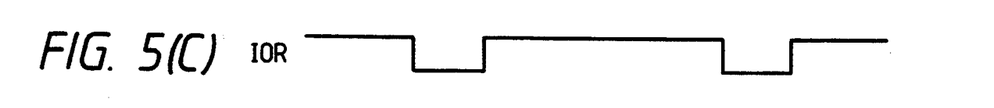
Figure 5D:
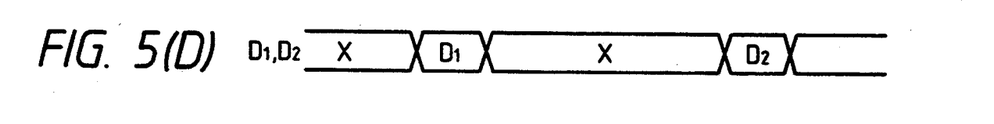

When the bus enable is given to the controller, a DAC (DMA Acknowledge) signal (FIG. 5(B)) is output to the I/F card 2 which in turn sends this signal to the drive device 3 to notify the bus enable. Similarly, an IOR (I/O Read) signal (FIG. 5(C)) which is a read control signal for controlling the timing of the data transfer is output to the drive device 3 through the I/F card 2.

A command DA which instructs the drive device 3 to output data in accordance with the IOR signal when it receives the DAC signal and the IOR signal is previously input to the drive device 3 through the I/F card 2. Accordingly, upper 8 bits ($D_1$) and lower 8 bits ($D_2$) of data reproduced by the drive device 3 are alternatingly output to the I/F card 2 (FIG. 5(D)) during the low-level period of the IOR signal. Similarly, the I/F card 2 transfers these data in an alternating manner to the computer 1.

In the conventional I/F card described above, 8-bit data output from the drive device are transferred to the computer in accordance with the IOR signal, and the controller controls the transfer so that the direct memory access is conducted on the memory of the computer, thereby achieving a high speed transfer. This produces a problem in that it is not possible to conduct the data transfer between, for example, a 16-bit computer and the drive device.

Moreover, it has been desired to conduct the data transfer from various peripheral devices including a drive device at a higher speed to allow a microprocessor to use a bus for a longer period, so that a computer has an advanced function and operates at a high speed.

SUMMARY OF THE INVENTION

It is an object of the invention to solve the above-discussed problems so that a computer which has an advanced function and operates at a high speed is realized.

According to an aspect of the present invention, there is provided an interface circuit which is to be connected between a computer which outputs a read control signal when an internal memory is set to a write enable state in response to a memory bus enable request signal from the external, and a peripheral device which outputs the memory bus enable request signal, and which, each time when the memory bus enable request signal is output and in response to the read control signal, outputs first and second digital data in accordance with the read control signal in an alternating manner, each of the first and second digital data being N bits (N is a positive integer), wherein the interface circuit includes hold means for holding the first digital data; discriminant means for discriminating between the first and second digital data from the peripheral device, on the basis of the memory bus enable request signal, and for generating a discriminating signal; and transfer control means for controlling a timing of transferring the first and second digital data to the computer, the transfer control means conducting a data transfer control in which, when the first digital data is output from the peripheral device, the transfer of the memory bus enable request signal to the computer is halted on the basis of the discriminating signal, a false read control signal is generated to be transferred to the peripheral device, and the first digital data output from the peripheral device in accordance with the false read control signal is held in the hold means, and, when the second digital data is output from the peripheral device, the halt of the transfer of the memory bus enable request signal to the computer is canceled in accordance with the discriminating signal, and 2N-bit data, i.e., the second digital data output from the peripheral device in accordance with the read control signal from the computer, and the first digital data which is held in the hold means are simultaneously transferred to the computer.

Further, according to the present invention, the computer is a 16-bit computer, and the peripheral device is a CD-ROM (Compact Disc-Read Only Memory) drive device for outputting the first and second digital data of 8 bits by reproducing a CD-ROM on which 16-bit digital data are recorded while each of the 16-bit digidata is split into two 8-bit digital data and undergoes the EFM modulation.

According to the invention having the above configuration, the discriminant means discriminates between the N-bit first and second digital data $D_1$ and $D_2$ output from the peripheral device, on the basis of the memory bus enable request signal DRQ, and generates the discriminating signal O/E. The transfer control means conducts the control in which, when the first digital data $D_1$ is output from the peripheral device, the transfer of the memory bus enable request signal DRQ to the computer is halted on the basis of the discriminating signal O/E, and a false read control signals FIOR and a false bus enable signal FDAC are generated to be output to the peripheral device, and the first digital data $D_1$ output from the peripheral device in accordance with the false read control signal FIOR is held in the hold means. When the second digital data $D_2$ is output from the peripheral device, the halt of the transfer of the memory bus enable request signal DRQ to the computer is canceled in accordance with the discriminating signal O/E, so that the memory bus enable request signal DRQ is transferred to the computer. When an internal memory is set to a write enable state through a memory bus from the external, the computer outputs the read control signal IOR to the peripheral device through the interface circuit. Furthermore, the transfer control means operates so that 2N-bit data, i.e., the N-bit second digital data $D_2$ output from the peripheral device in accordance with the read control signal IOR, and the N-bit first digital data $D_1$ which is held in the hold means are simultaneously transferred to the computer.

BRIEF DESCRIPTION OF THE DRAWINGS

FIG. 3 (A) to (K) are timing charts of a data transfer which is conducted through the interface circuit of FIG. 2;

FIG. 5 (A) to (D) are timing charts of the data transfer of FIG. 4.

DETAILED DESCRIPTION OF THE PREFERRED EMBODIMENTS

Preferred embodiment will now be described with reference with the accompanying drawings.

Figure 1:
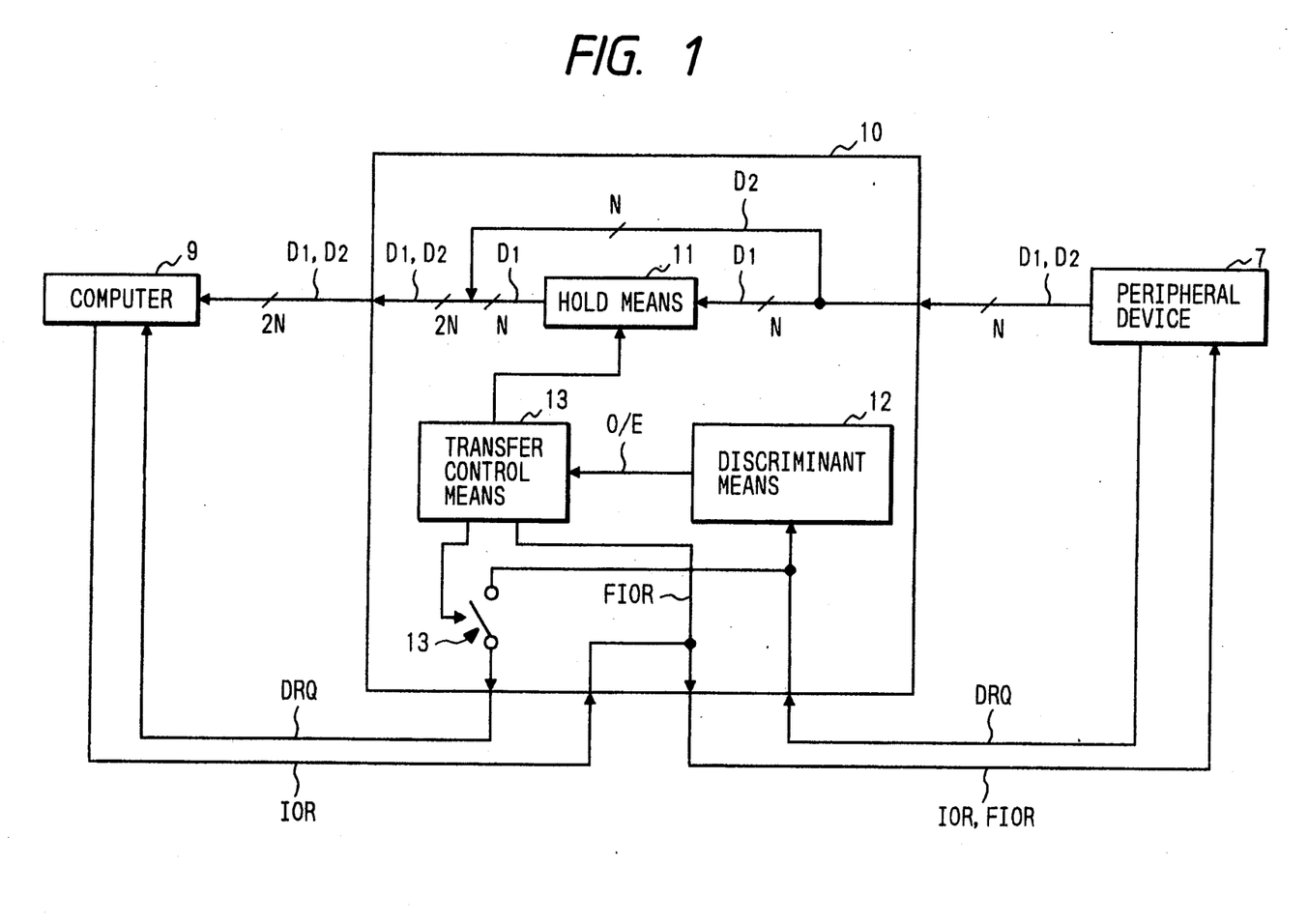
FIG. 1 is a block diagram showing the principal structure of the invention.

The above problems can be solved by the configuration of the present invention which is shown in a diagram of FIG. 1 showing the principal structure as follows.

In other words, the problems can be solved by an interface circuit 10 to be connected between a computer 9 which outputs a read control signal IOR when an internal memory is set to a write enable state in response to a memory bus enable request signal DRQ from the external, and a peripheral device 7 which outputs the memory bus enable request signal DRQ, and which, each time when the memory bus enable request signal DRQ is output and in response to the read control signal IOR, outputs first and second digital data $D_1$ and $D_2$ in accordance with the read control signal IOR in an alternating manner, each of the first and second digital data being N bits (N is a positive integer), the interface circuit transferring the memory bus enable request signal DRQ from the peripheral device 7 to the computer 9, and the read control signal IOR from the computer 9 to the peripheral device 7, and transferring the first digital data $D_1$ and the second digital data $D_2$ from the peripheral device 7 to the computer 9, the interface circuit 10 comprising: hold means 11 for holding the first digital data $D_1$; discriminant means 12 for discriminating between the first and second digital data $D_1$ and $D_2$ from the peripheral device 7, on the basis of the memory bus enable request signal DRQ, and for generating a discriminating signal O/E; and transfer control means 13 for controlling a timing of transferring the first and second digital data $D_1$ and $D_2$ to the computer 9, the transfer control means 13 conducting a data transfer control in which, when the first digital data $D_1$ is output from the peripheral device 7, the transfer of the memory bus enable request signal DRQ to the computer 9 is halted on the basis of the discriminating signal O/E, and a false read control signals FIOR and a false bus enable signal FDAC are generated and output to the peripheral device 7, and the first digital data $D_1$ output from the peripheral device 7 in accordance with the false read control signal FIOR is held in the hold means 11, and, when the second digital data $D_2$ is output from the peripheral device 7, the halt of the transfer of the memory bus enable request signal DRQ to the computer 9 is canceled in accordance with the discriminating signal O/E, and 2N-bit data, i.e., the second digital data $D_2$ output from the peripheral device 7 in accordance with the read control signal IOR from the computer 9, and the first digital data $D_1$ which is held in the hold means 11 are simultaneously transferred to the computer 9.

Figure 2:
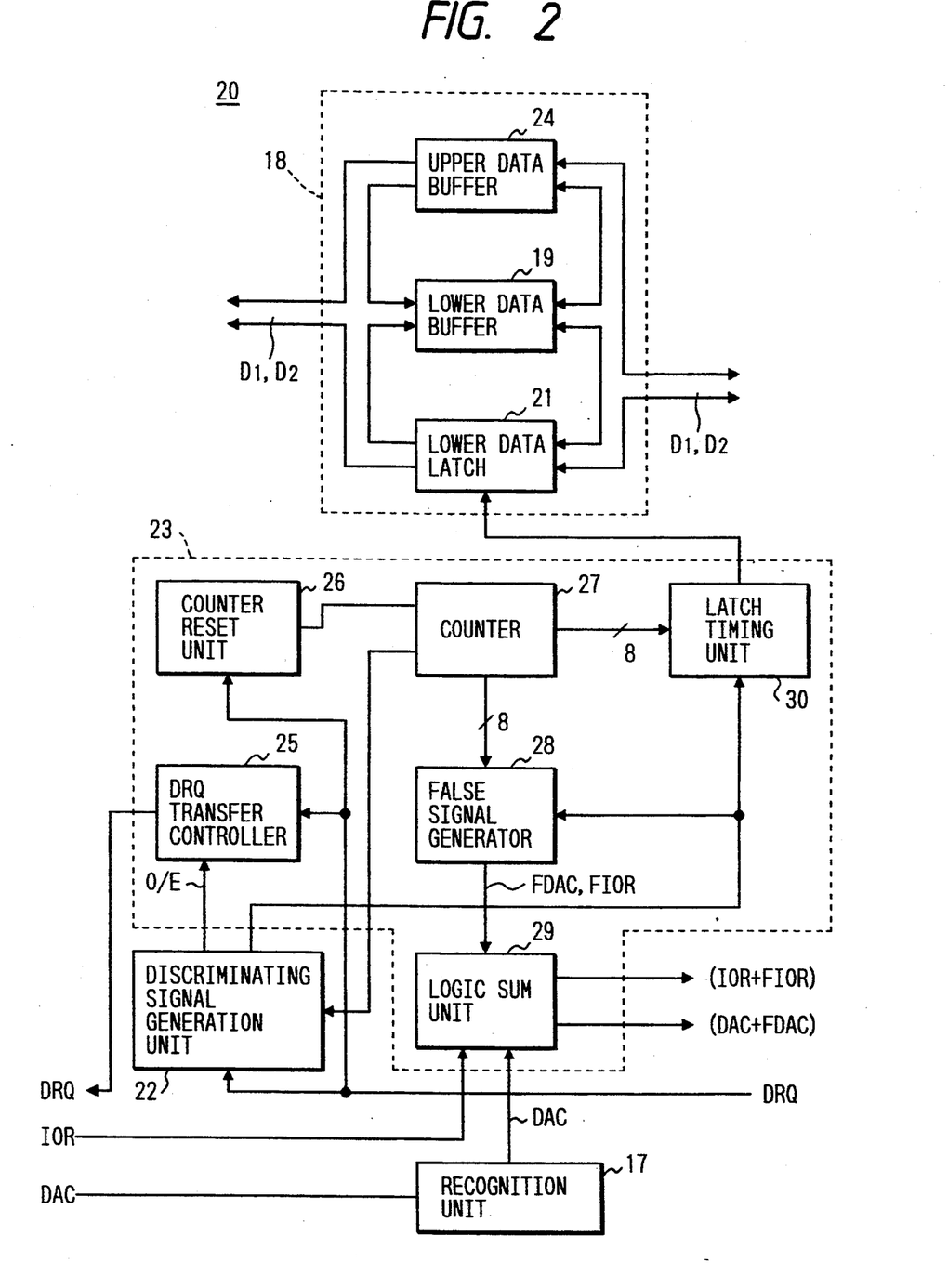
FIG. 2 is a block diagram of an embodiment of the invention.

FIG. 2 is a block diagram of an embodiment of the interface circuit 10 according to the invention. In FIG. 2, an I/F card 20 which functions as the interface circuit generally consists of a recognition unit 17, a data transfer unit 18, a discriminating signal generation unit 22 which functions as the discriminant means, and a control unit 23 which functions as the transfer control means. The I/F card 20 is detachably mounted in a 16-bit computer which is not shown, and electrically connected between a drive device (not shown) and the 16-bit computer.

The recognition unit 17 is constructed as, for example, a mechanical switch, and conducts the switching operation so that the bus enable signal DAC from the computer is selected to be supplied or not supplied to the control unit 23. When the I/F card 20 is mounted in the computer and the drive device is connected to the I/F card 20, the state of the switch is changed so that the bus enable signal DAC is output. In the following description, it is assumed that the bus enable signal DAC is output.

The data transfer unit 18 consists of an 8-bit lower data buffer 19, an 8-bit upper data buffer 24, and a lower data latch 21 which is 8-bit hold means. The latch timing of the lower data latch 21 is controlled by the control unit 23, so that the data transfer from the drive device to the 16-bit computer is controlled in the manner described below.

Figure 3A:
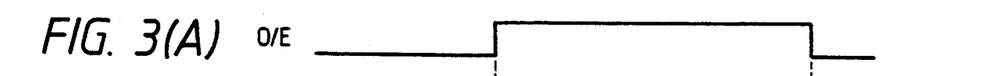
Figure 3B:
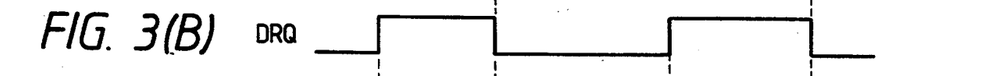
Figure 3C:
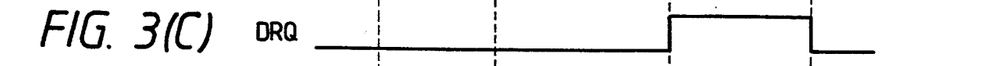
Figure 3D:
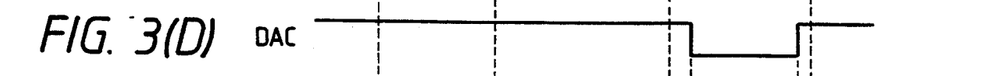
Figure 3E:
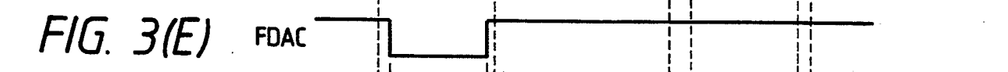
Figure 3F:
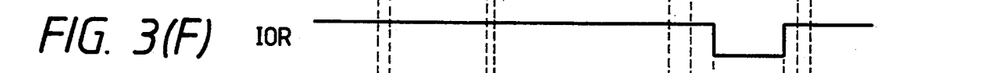
Figure 3G:
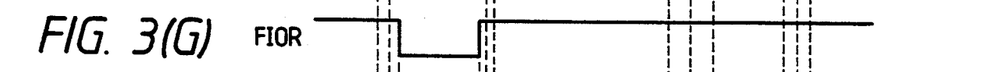
Figure 3H:
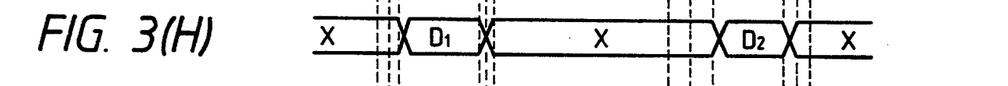

As shown in FIG. 3, the discriminating signal generation unit 22 judges whether 8-bit data from the drive device is the upper 8-bit data $D_2$ of a 16-bit data or the lower 8-bit data $D_1$ (FIG. 3(H)), on the basis of the memory bus enable request signal DRQ (FIG. 3(B)) from the drive device, and outputs a discriminant signal O/E (FIG. 3(A)) the level of which is inverted at each trailing edge of the memory bus enable request signal DRQ.

The control unit 23 consists of a DRQ transfer controller 25, a counter reset unit 26, a counter 27, a false signal generator 28, a logic sum circuit 29, and a latch timing unit 30 which are connected as shown in FIG. 2. The control unit 23 controls the data transfer unit on the basis of the discriminant signal O/E as described below, thereby controlling the data transfer from the drive device to the 16-bit computer.

The DRQ transfer controller 25 conducts the control so that, when the level of the discriminant signal O/E is low, the memory bus enable request signal DRQ is not output to the computer, and, when the level is high, the signal DRQ is output to the computer.

More specifically, before time $t_3$ and after time $t_6$ in FIG. 3, the DRQ transfer controller 25 conducts the control in which the memory bus enable request signal DRQ is not output to the computer, and, between times $t_3$ and $t_6$, the control in which the memory bus enable request signal DRQ shown in FIG. 3(C) is allowed to be output from the I/F card 20 to the computer.

Therefore, the computer transfers the bus enable signal DAC of FIG. 3(D) to the recognition unit 17 of the I/F card 20, and the read control signal IOR of FIG. 3(F) to the logic sum circuit 29 of the I/F card 20.

On the other hand, the counter reset unit 26 generates a reset signal at the leading edge (times $t_1$ and $t_4$) of the memory bus enable request signal DRQ from the drive device, thereby resetting the counter 27. The counter 27 is an 8-bit shift register to which data having a level that is always high are input. The counter counts pulses of a clock pulse signal (not shown), and is configured so that, when once set to a high level as a result of the counting operation, the outputs of 8 bits are not returned to the low level until the counter is reset.

On the basis of the timing of the output of each bit of the counter 27, the false signal generator 28 generates as illustrated the false bus enable signal FDAC (FIG. 3(E)) and a false read control signal FIOR (FIG. 3(G)) which have a substantially same timing as that of the bus enable signal DAC and the read control signal IOR.

The logic sum circuit 29 outputs a logic sum of the read control signal IOR from the computer and the false read control signal FIOR from the false signal generator 28, and a logic sum of the bus enable signal DAC from the recognition unit 17 and the false bus enable signal FDAC from the false signal generator 28.

When the level of the discriminant signal O/E is low, therefore, the memory bus enable request signal DRQ from the drive device is transferred to the computer (times $t_1$ to $t_3$), whereby the computer is caused to output the bus enable signal DAC and the read control signal IOR as if the computer received the memory bus enable request signal DRQ.

In contrast, when the level of the discriminant signal O/E is high, the computer actually receives the memory bus enable request signal DRQ, and outputs the bus enable signal DAC and the read control signal IOR. Then, the logic sum circuit 29 of the I/F card 20 outputs logic sum signals DAC+FDAC (FIG. 3(J)) and IOR+FIOR (FIG. 3(K)).

The latch timing unit 30 outputs a latch signal to the lower data latch 21, on the basis of the discriminant signal O/E and the output timing of each bit of the counter 27.

This causes the lower 8-bit data (first digital data) $D_1$ which is transferred from the drive device after a predetermined time is elapsed from time $t_2$ as shown in FIG. 3(H), to be latched by the lower data latch 21 in accordance with the read control signal IOR of FIG. 3(G) and held therein.

Figure 3I:
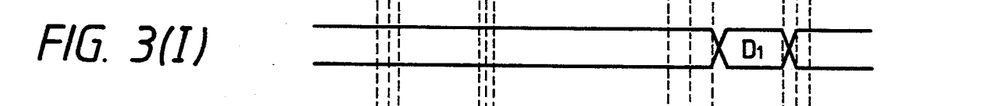
Figure 3J:
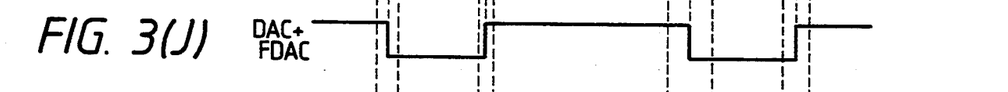
Figure 3K:
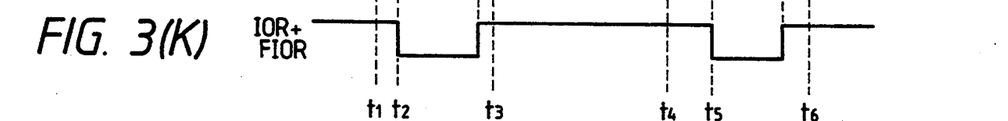

At the substantially same time when the upper 8-bit data (second digital data) $D_2$ which is similarly transferred from the drive device after a predetermined time is elapsed from time $t_5$ as shown in FIG. 3(H) is transferred to the computer through the upper data buffer 24, the lower 8-bit data $D_1$ held in the lower data latch 21 is output therefrom as shown in FIG. 3(I), resulting in that a 16-bit data is transferred to the computer.

The lower data buffer 19 performs the operation in which, when the computer is at the state of ENABLE AND IOR, a lower 8-bit data is transferred from the drive device to the computer, and, when the computer is at the state of ENABLE AND IOW, a lower 8-bit data from the computer is passed to the drive device. The lower data buffer 19 is not directly related to the invention, and therefore its detailed description is omitted.

As described above, according to the invention, when a 16-bit data is to be transferred from a CD-ROM drive device to a computer, a lower 8-bit data among upper and lower 8-bit data of a CD-ROM disc which are alternatingly output as an 8-bit unit from the CD-ROM drive device is once held. Then, the held lower 8-bit data and the upper 8-bit data are transferred together as a 16-bit unit to the computer. Accordingly, also the data transfer to a 16-bit computer can be conducted with the direct memory access.

Furthermore, during the process in which a lower 8-bit data is output from the CD-ROM drive device, the memory bus enable request signal DRQ is not transferred to the computer. Accordingly, the microprocessor can perform other processes during this process, thereby allowing the computer to conduct an advanced function and operate at a higher speed.

In the above, an embodiment in which a CD-ROM drive device is used as a peripheral device has been described. Alternatively, other drive devices such as a CD-I, and a CD-R may be used. It is a matter of course that the number of bits of output data of these drive devices and that of a computer are not restricted to 16.

As described above, according to the invention, when a first digital data is output from a peripheral device, the transfer of a memory bus enable request signal to a computer is halted, and the first digital data is output from the peripheral device in accordance with a false read control signal from an interface circuit, and held in hold means. During this process, therefore, the microprocessor of the computer can perform other processes, so that the computer has an advanced function and operates at a higher speed. In contrast, when a second digital data is output from the peripheral device, the memory bus enable request signal is transferred to the computer, and 2N-bit data, i.e., the N-bit second digital data output from the peripheral device, and the N-bit first digital data which is held, are simultaneously transferred to the computer in accordance with the read control signal from the computer. Accordingly, the interface circuit of the invention has features such as that it can conduct the data transfer at a higher speed than that of the conventional art in which the direct memory access is conducted on the computer in unit of N bits, and that, even if the computer is of 2N bits, data can be transferred to the internal memory with the direct memory access.

What is claimed is:

1. A data transfer system comprising:
   a main device for outputting a read control signal when an internal memory is set to a write enable state in response to a memory bus enable request signal;
   an auxiliary device for outputting the memory bus enable request signal and for alternately outputting first and second digital data in N-bit, where N is a positive integer, respectively, in accordance with the read control signal each time said memory bus enable request signal is output and in response to the read control signal; and
   an interface circuit, operatively coupled to said main device and to said auxiliary device, for transferring the memory bus enable request signal generated by the auxiliary device to the main device and for transferring the first digital data and the second digital data from the auxiliary device to the main device,
   the interface circuit including:
      hold means for holding the first digital data output from the auxiliary device;
      means, operatively coupled to said auxiliary device, for generating a discriminating signal by discriminating between the first digital data and the second digital data transmitted from the auxiliary device on the basis of the memory bus enable request signal generated by the auxiliary device; and
      transfer control means, operatively coupled to said hold means and said discriminating means, for controlling a timing of transferring the first digital data and the second digital data to the main device from said auxiliary device,
      wherein said transfer control means includes means for inhibiting a transfer of the memory bus enable request signal to the main device on the basis of the discriminating signal when the first digital data is outputted from the auxiliary device,
      means, operatively coupled to said inhibiting means, for generating a false read control signal to transfer to the auxiliary device,
      means, operatively coupled to said false read control signal generating means and said inhibiting means, for holding the first digital data outputted from the auxiliary device into the hold means in accordance with the false read control signal, and for cancelling an inhibition of transferring of the memory bus enable request signal in accordance with the discriminating signal when the second digital data is outputted from the auxiliary device, and
      means, operatively coupled to said false signal generating means and to said main device, for simultaneously transferring 2N-bit data, including the second digital data outputted from the auxiliary device and the first digital data which is held in the hold means in accordance with the read control signal generated from the main device, to the main device.

2. A data transfer system as claimed in claim 1, wherein the main device comprises a 16-bit computer, and the auxiliary device comprises a compact disk-read-only memory (CD-ROM) drive device for outputting the first digital data and the second digital data of 8 bits by reproducing a CD-ROM on which 16-bit digital data are recorded while each of the 16-bit digital data is split into a plurality of 8-bit digital data and undergoes eight-to-fourteen (EFM) modulation.

3. A data transfer system comprising:
   a main device for outputting a read control signal when an internal memory is set to a write enable state in response to a memory bus enable request signal;
   an auxiliary device for outputting the memory bus enable request signal and for alternately outputting first and second digital data in N-bit, where N is a positive integer, respectively, in accordance with the read control signal each time said memory bus enable request signal is output and in response to the read control signal; and
   an interface circuit, operatively coupled to said main device and to said auxiliary device, for transferring the memory bus enable request signal generated by the auxiliary device to the main device and for transferring the first digital data and the second digital data from the auxiliary device to the main device,
   the interface circuit including:
      hold means for holding the first digital data output from the auxiliary device;
      means operatively coupled to said auxiliary device, for generating a discriminating signal by discriminating between the first digital data and the second digital data transmitted from the auxiliary device on the basis of the memory bus enable request signal generated by the auxiliary device; and
      transfer control means, operatively coupled to said hold means and said discriminating means, for controlling a timing of transferring the first digital data and the second digital data to the main device from said auxiliary device,
      wherein said transfer control means includes means for inhibiting a transfer of the memory bus enable request signal to the main device on the basis of the discriminating signal when the first digital data is outputted from the auxiliary device,
      means, operatively coupled to said inhibiting means, for generating a false read control signal to transfer to the auxiliary device,
      means, operatively coupled to said false read control signal generating means and said inhibiting means, for holding the first digital data outputted from the auxiliary device into the hold means in accordance with the false read control signal, and for cancelling an inhibition of transferring of the memory bus enable request signal in accordance with the discriminating signal when the second digital data is outputted from the auxiliary device, and
      means, operatively coupled to said false signal generating means and to said main device, for simultaneously transferring 2N-bit data, including the second digital data outputted from the auxiliary device and the first digital data which is held in the hold means in accordance with the read control signal generated from the main device, to the main device,
   wherein the main device comprises a 16-bit computer, and the auxiliary device comprises a compact disk-read-only memory (CD-ROM) drive device for outputting the first digital data and the second digital data of 8 bits by reproducing a CD-ROM on which 16-bit digital data are recorded while each of the 16-bit digital data is split into a plurality of 8-bit digital data and undergoes eight-to-fourteen (EFM) modulation, wherein the discriminating means includes means for generating the discriminating signal having a level which is inverted at each trailing edge of the memory bus enable request signal, in accordance with judging whether or not 8-bit data outputted from the auxiliary device includes the first digital data or second digital data on the basis of the memory bus enable request signal from the auxiliary device.

4. A data transfer system comprising:

a main device for outputting a read control signal when an internal memory is set to a write enable state in response to a memory bus enable request signal;

an auxiliary device for outputting the memory bus enable request signal and for alternately outputting first and second digital data in N-bit, where N is a positive integer, respectively, in accordance with the read control signal each time said memory bus enable request signal is output and in response to the read control signal; and an interface circuit, operatively coupled to said main device and to said auxiliary device, for transferring the memory bus enable request signal generated by the auxiliary device to the main device and for transferring the first digital data and the second digital data from the auxiliary device to the main device, the interface circuit including:

hold means for holding the first digital data output from the auxiliary device;

means, operatively coupled to said auxiliary device, for generating a discriminating signal by discriminating between the first digital data and the second digital data transmitted from the auxiliary device on the basis of the memory bus enable request signal generated by the auxiliary device; and transfer control means, operatively coupled to said hold means and said discriminating means, for controlling a timing of transferring the first digital data and the second digital data to the main device from said auxiliary device, wherein said transfer control means includes means for inhibiting a transfer of the memory bus enable request signal to the main device on the basis of the discriminating signal when the first digital data is outputted from the auxiliary device, means, operatively coupled to said inhibiting means, for generating a false read control signal to transfer to the auxiliary device, means, operatively coupled to said false read control signal generating means and said inhibiting means, for holding the first digital data outputted from the auxiliary device into the hold means in accordance with the false read control signal, and for cancelling an inhibition of transferring of the memory bus enable request signal in accordance with the discriminating signal when the second digital data is outputted from the auxiliary device, and means, operatively coupled to said false signal generating means and to said main device, for simultaneously transferring 2N-bit dam, including the second digital data outputted from the auxiliary device and the first digital data which is held in the hold means in accordance with the read control signal generated from the main device, to the main device, wherein the transfer control means includes:

a memory bus enable request signal transfer controller for inhibiting a transfer of the memory bus enable request signal to the main device when the discriminating signal has a low level, and for transmitting the memory bus enable request signal to the main device when the discriminating signal has a high level;

a counter reset device for generating a reset signal at a leading edge of the memory bus enable request signal from the auxiliary device;

a counter for being reset at receiving the reset signal;

a false signal generator for generating a false bus enable signal and a false read control signal on the basis of a timing of an output of each bit of the counter;

a logic sum circuit for outputting a logic sum of the read control signal from the main device and the false read control signal and a logic sum of a bus enable signal from the interface circuit and the false bus enable signal generated by the false signal generator; and a latch timing unit for outputting a latch signal on the basis of the discriminating signal and a timing of each bit of the counter.

5. An interface device between a main device and an auxiliary device, comprising:

hold means, operatively coupled to said main device and to said auxiliary device, for holding first digital data transmitted from said auxiliary device;

discriminating means for generating a discriminating signal by discriminating between the first digital data and second digital data transmitted from the auxiliary device on the basis of a memory bus enable request signal generated from said main device;

transfer control means for controlling a timing of transferring the first digital data and the second digital data to said main device; and an interface circuit for transferring the memory bus enable request signal generated by the auxiliary device to the main device and for transferring the first digital data and the second digital data from the auxiliary device to the main device, wherein said transfer control means includes:

means for inhibiting a transfer of the memory bus enable request signal to the main device on the basis of the discriminating signal when the first digital data is outputted from the auxiliary device, means, operatively coupled to said inhibiting means, for generating a false read control signal to transfer the auxiliary device, means, operatively coupled to said false read control signal generating means and said inhibiting means, for holding the first digital data outputted from the auxiliary device into the hold means in accordance with the false read control signal, and for cancelling an inhibition of transferring of the memory bus enable request signal in accordance with the discriminating signal when the second digital data is outputted from the auxiliary device, and means, operatively coupled to said false signal generating means and to said main device, for simultaneously transferring 2N-bit data including the second digital data outputted from the auxiliary device and the first digital data which is held in the hold means in accordance with the read control signal generated from the main device, to the main device, where N is a positive integer.

6. A data transfer system according to claim 1, wherein the discriminating means includes means for generating the discriminating signal having a level which is inverted at each trailing edge of the memory bus enable request signal, in accordance with judging whether or not 8-bit data outputted from the auxiliary device includes the first digital data or second digital data on the basis of the memory bus enable request signal from the auxiliary device.

7. A data transfer system according to claim 1, wherein the transfer control means includes a memory bus enable request signal transfer controller for inhibiting a transfer of the memory bus enable request signal to the main device when the discriminating signal has a low level, and for transmitting the memory bus enable request signal to the main device when the discriminating signal has a high level.

8. A data transfer system according to claim 1, wherein said transfer control means includes a counter reset device for generating a reset signal at a leading edge of the memory bus enable request signal from the auxiliary device.

9. A data transfer system according to claim 8, wherein said transfer control means further includes a counter for being reset at receiving the reset signal from said counter reset device.

10. A data transfer system according to claim 9, wherein said false signal generating means includes a false signal generator for generating a false bus enable signal and a false read control signal on the basis of a timing of an output of each bit of the counter.

11. A data transfer system according to claim 1, wherein said transfer control means further includes a logic sum circuit for outputting a logic sum of the read control signal from the main device and the false read control signal and a logic sum of a bus enable signal from the interface circuit and the false bus enable signal generated by the false signal generating means.

12. A data transfer system according to claim 8, wherein said transfer control means further includes a logic sum circuit for outputting a logic sum of the read control signal from the main device and the false read control signal and a logic sum of a bus enable signal from the interface circuit and the false bus enable signal generated by the false signal generating means.

13. A data transfer system according to claim 9, wherein said transfer control means further includes a logic sum circuit for outputting a logic sum of the read control signal from the main device and the false read control signal and a logic sum of a bus enable signal from the interface circuit and the false bus enable signal generated by the false signal generating means.

14. A data transfer system according to claim 9, wherein said transfer control means further includes a latch timing unit for outputting a latch signal on the basis of the discriminating signal and a timing of each bit of the counter.

15. A data transfer system according to claim 10, wherein said transfer control means further includes a latch timing unit for outputting a latch signal on the basis of the discriminating signal and a timing of each bit of the counter.

16. An interface device according to claim 5, wherein the discriminating means includes means for generating the discriminating signal having a level which is inverted at each trailing edge of the memory bus enable request signal, in accordance with judging whether or not 8-bit data outputted from the auxiliary device includes the first digital data or second digital data on the basis of the memory bus enable request signal from the auxiliary device.

17. A data transfer system according to claim 5, wherein the transfer control means includes a memory bus enable request signal transfer controller for inhibiting a transfer of the memory bus enable request signal to the main device when the discriminating signal has a low level, and for transmitting the memory bus enable request signal to the main device when the discriminating signal has a high level.

18. A data transfer system according to claim 5, wherein said transfer control means includes a counter reset device for generating a reset signal at a leading edge of the memory bus enable request signal from the auxiliary device.

19. A data transfer system according to claim 18, wherein said transfer control means further includes a counter for being reset at receiving the reset signal from said counter reset device.

20. A data transfer system according to claim 19, wherein said false signal generating means includes a false signal generator for generating a false bus enable signal and a false read control signal on the basis of a timing of an output of each bit of the counter, and
wherein said transfer control means further includes a logic sum circuit for outputting a logic sum of the read control signal from the main device and the false read control signal and a logic sum of a bus enable signal from the interface circuit and the false bus enable signal generated by the false signal generator.

* * * * *